June 4, 1968 R. L. MILLER ET AL 3,387,095

CONFERENCE SYNCHRONIZING SYSTEM

Filed April 13, 1965 2 Sheets-Sheet 1

INVENTORS R. L. MILLER
W. R. YOUNG, JR.
BY Jules P. Kirsch
ATTORNEY

June 4, 1968 R. L. MILLER ET AL 3,387,095

CONFERENCE SYNCHRONIZING SYSTEM

Filed April 13, 1965 2 Sheets-Sheet 2

3,387,095

CONFERENCE SYNCHRONIZING SYSTEM

Ralph L. Miller, Chatham, and William Rae Young, Jr., Middletown, N.J., assignors to Bell Telephone Laboratories, Incorporated, New York, N.Y., a corporation of New York Filed Apr. 13, 1965, Ser. No. 447,822
9 Claims. (Cl. 179—18)

ABSTRACT OF THE DISCLOSURE

A conference call communication system for subscriber stations equipped with vocoders is arranged to prevent interference between coded signals from talkers speaking simultaneously. The system includes an "allotter" which recognizes only one subscriber as the talker at a given time, and which causes coded signals from the talker station to be delivered over a unidirectional path to all other stations. Receiver stations are connected to the talker station via a separate unidirectional path. Each listener may communicate a request to interrupt the talker without interfering with the talker's coded signal, and the talker may signal the allotter to transfer control of the talk channel. Frame synchronization is maintained when control is transferred to another station by supplying a frame reference signal to all stations. A frame reference monitor at each station serves to interpose sufficient delay in each channel as required to maintain synchronization.

Figure 1:
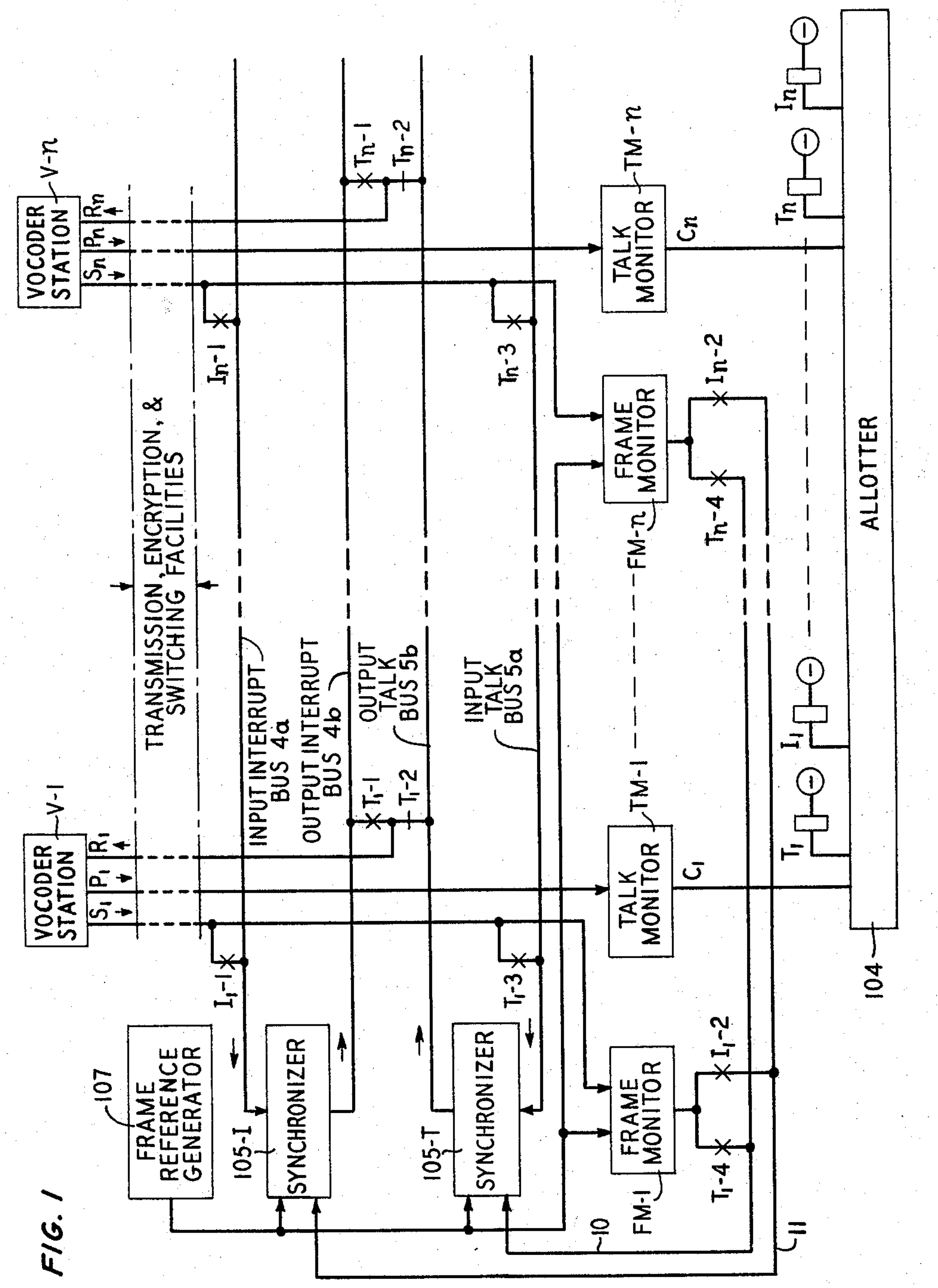

This invention relates to conference call equipment, and in particular to equipment for providing conference call service for subscriber stations wherein one or more of the subscriber stations is provided with vocoder speech communication apparatus.

Conventional speech communication systems, for example, conventional telephone systems, typically convey human speech by transmitting an electrical facsimile or analogue of the acoustic waveform produced by a human talker. Because of the redundancy of human speech, however, facsimile or analogue transmission is a relatively inefficient way to transmit speech, and it is well known that the information contained in a typical speech sound may be transmitted over a channel of substantially narrower bandwidth than that required for analogue transmission of the speech waveform. A number of arrangements for compressing or reducing the amount of bandwidth employed in the transmission of speech have been proposed, one of these arrangements being the well-known vocoder, a description of several varieties of which may be found in articles by E. E. David, Jr., entitled, "Signal Theory in Speech Transmission," vol. CT–3, IRE Transactions on Circuit Theory, p. 232 (1956), and by P. G. Edwards and J. Clapper, Jr., entitled "Better Vocoders Are Coming," vol. 1, IEEE Spectrum, p. 119 (1964).

Vocoders reduce the bandwidth required for speech transmission by transmitting information about selected speech characteristics instead of an electrical analogue of the speaker's acoustic waveform. At a vocoder transmitter station there is provided an analyzer for deriving from an analogue speech signal a group of relatively narrow bandwidth control signals, each representative of one of a number of selected speech characteristics. The combined bandwidth of the narrow band control signals is substantially narrower than the bandwidth of the corresponding analogue signal, and therefore the narrow band control signals may be transmitted over a relatively narrow bandwidth channel to a vocoder receiver station. At a vocoder receiver station there is provided a synthesizer for reconstructing a replica of the original analogue speech signal from the control signals. In addition, each vocoder station may also be provided with pulse coding and decoding equipment in order to transmit the control signals in a suitable pulse code, thereby gaining the advantages associated with pulse code transmission. In the following description, it will be assumed that all vocoder stations are equipped with pulse coding and decoding apparatus, and the pulse coded control signals transmitted between stations will be referred to simply as coded signals.

In areas in which communication service is provided by equipping subscribed stations with vocoder equipment, it is often desired to give services generally available to conventional telephone subscribers, one such service being the ability to make conference calls. However, in attempting to give conference call service to stations having vocoder equipment, it has been determined that conventional conference call arrangements are not suitable for use by vocoder stations. Thus, in a conventional conference call circuit analogue voice signals from a number of individual subscribers, two or more of whom may be speaking simultaneously, are mixed together on a common bus and the resulting signal mixture is then delivered to all of the subscriber stations; for example, see R. M. Hultberg Patent 3,135,829, issued June 2, 1964. However, mixing on a common bus of the coded signals produced simultaneously by two or more talkers at vocoder stations results in interference between the coded signals, thereby impairing the intelligibility of the speech reconstructed from the coded signal mixture. It has been proposed that interference between coded signals may be eliminated by modifying a conventional conference call circuit to include equipment for converting each talker's coded signal into an analogue speech signal before mixing together two or more talkers' speech signals, as well as equipment for converting the resulting analogue signal mixture into coded signals to be routed to each conference station. However, it has been determined that in a number of instances it is not satisfactory to put two or more vocoder links in tandem, that is, it is not satisfactory to introduce the decoded signal from one vocoder link into a second vocoder link for re-encoding.

The present invention provides conference call service for stations equipped with vocoders which prevents interference between coded signals from talkers speaking simultaneously by recognizing only one station as a talker at a given time, together with giving all other stations access to interrupt the talking station. This is achieved by providing a conference call arrangement that includes a so-called allotter that recognizes only one subscriber as the talker at a given time, and following this recognition the allotter causes the coded signal from this subscriber to be broadcast over a first unidirectional signal path to which the receivers of all other conference subscribers are connected. At the same time, the receiver of the talking station is connected by the allotter to a second unidirectional path to which the transmitter of any one of the listening stations may be connected in the event that one of the listening subscribers wishes to interrupt the talking subscriber. In this fashion, a listening subscriber who wishes to speak is able to communicate a request to interrupt to the talker without interfering with the talker's coded signal which is currently being broadcast to all of the other conference stations. In response to a request to interrupt from a listening subscriber, the talker, by appropriately signaling the allotter, may relinquish to the interrupting subscriber control of the unidirectional broadcast path.

In the case of coded signals which represent vocoder control signals in terms of a selected pulse code, the coded signal that is transmitted between stations comprises a so-called bit stream of pulses which are grouped into words or frames, and in order for a bit stream to be converted into intelligible speech it is necessary to establish frame synchronization at each station that receives the bit stream. Since the transmitters of the individual stations connected to the conference equipment of this invention are not ordinarily in frame synchronization with one another, each time a new talking station or a new interrupting station is recognized by the allotter, every station receiving the new bit stream would ordinarily be required to reacquire a new frame synchronization. However, reacquisition of frame synchronization requires a variable amount of time, depending upon such factors as the previous framing condition, and the presence of errors in the frame synchronizing information contained in each frame of the bit stream. Because of this delay, the opening remarks from a new talking or interrupting station might be lost before all stations have reacquired frame synchronization. One possible solution to the problem is to have a newly recognized station transmit a framing signal to each of the receiving stations well in advance of speaking, but it is apparent that the imposition of delay between recognition by the allotter and speaking makes conversation unnatural and awkward.

The present invention overcomes this problem in a way that permits a subscriber to communicate as soon as he is recognized by the allotter. This is accomplished by generating an arbitrary frame reference signal that is supplied continuously to all vocoder receivers in order to maintain a uniform frame synchronization of all receivers at all times. Further, the frame synchronizing information in each frame of each incoming bit stream is compared with the arbitrary frame reference signal to determine the relative time difference, if any, between the framing of a talking or interrupting station's bit stream and the framing of all the vocoder stations. A signal representative of this relative time difference is utilized to control a variable delay element interposed in each unidirectional path so that an incoming bit stream is delayed by an appropriate amount before it is delivered to each listening station in synchrony with the framing established by the frame reference signal. Thus a newly recognized subscriber is permitted to speak immediately upon recognition, the delay, if any, being imposed upon the subscriber's bit stream during its transmission between stations.

Figure 2:
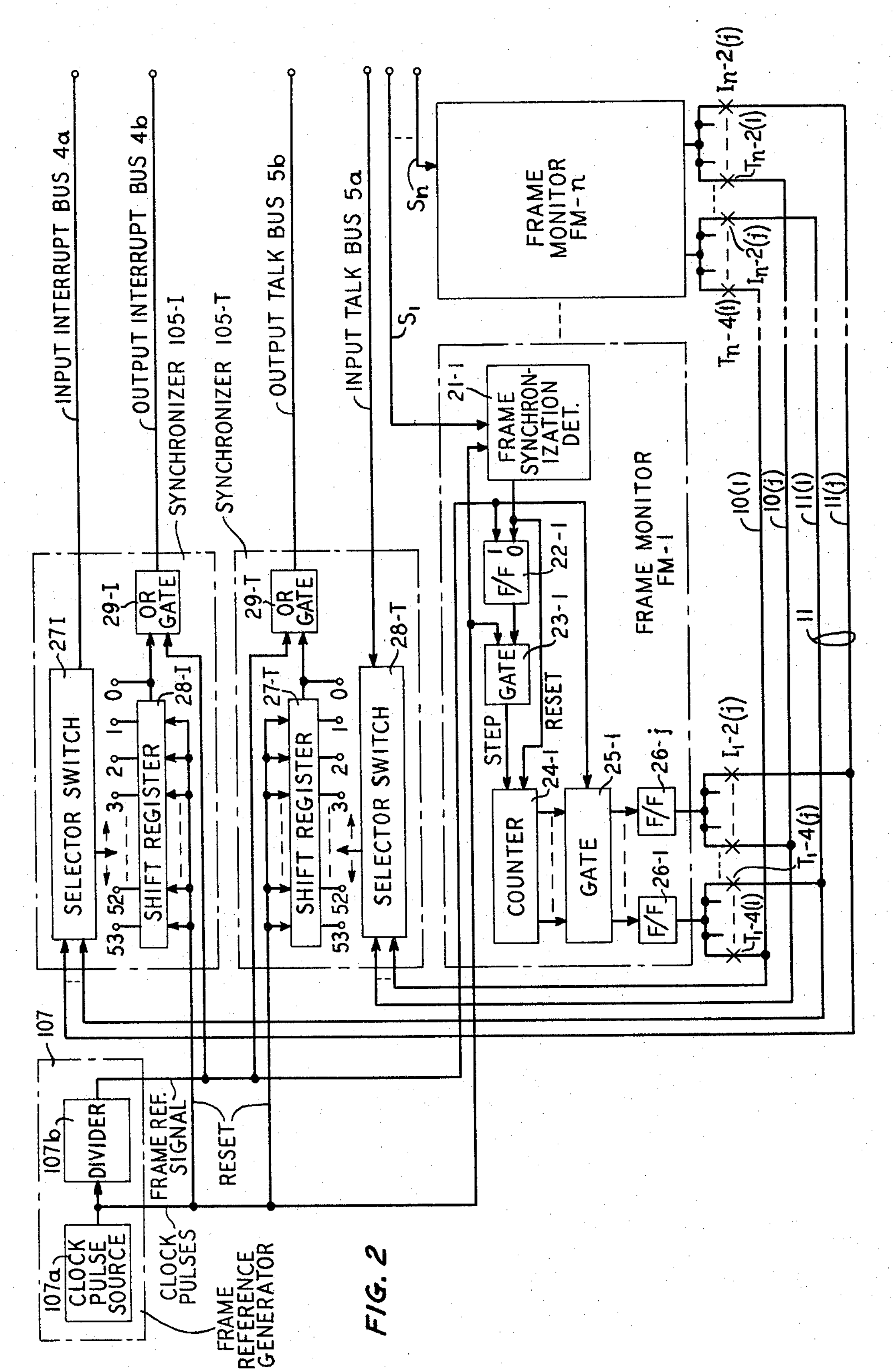

The invention will be fully understood from the following detailed description of the illustrative embodiments thereof taken in connection with the appended drawings, in which:

FIG. 1 is a block diagram of a conference call circuit embodying the principles of this invention; and FIG. 2 is a circuit diagram showing in detail certain elements of the apparatus illustrated in FIG. 1.

Referring first to FIG. 1, this drawing illustrates equipment for providing conference service to a number of stations, V–1 through V–*n*, which are equipped with vocoder speech communication apparatus of any one of a variety of well-known types; for example, the vocoder apparatus may be one of the varieties described in the above-mentioned Edwards-Clapper article. It is to be understood that any desired number of stations may be included in a conference, the symbol *n* signifying any positive integer greater than 2. In addition, it is to be understood that each vocoder station is equipped to transmit and receive vocoder control signals in digital form; that is, vocoder control signals representing selected speech characteristics are transmitted between stations in the form of a suitable pulse code, for example, in the manner shown in FIG. 2 of the Edwards-Clapper article. The typical vocoder apparatus at a vocoder station will therefore include at least the following elements: a transmitter including a vocoder analyzer for deriving narrow bandwidth control signals representing selected characteristics of a subscriber's speech, and an encoder for converting the outgoing control signals into digital data, also referred to as a bit stream; and a receiver including a decoder for converting the incoming digital data from another vocoder station into control signals, and a vocoder synthesizer for reconstructing intelligible speech from the control signals.

An outgoing bit stream from the transmitter at a vocoder station is conveyed over a transmission path or lead denoted S in FIG. 1, and an incoming bit stream is conveyed to the receiver at a vocoder station over a receiving path or lead denoted R. In addition, a separate request-to-talk lead denoted P is shown for each station, this lead serving to indicate the mechanism by which a subscriber enters a request to talk during a conference connection. However, as explained in the copending R. L. Miller-W. R. Young, Jr. application, Ser. No. 418,635, filed Dec. 16, 1964, the P lead merely symbolizes the request-to-talk function, since any one of a number of different arrangements may be employed to convey a request to talk from a subscriber to the conference equipment of this invention. The broken portions of the S, P, and R leads indicate the transmission, encryption, and switching facilities that may be employed to connect the individual stations with the conference equipment, it being understood that such facilities may be of any desired construction. The connection of the S, P, and R leads to the conference equipment is the same for each vocoder station; for example, as shown for vocoder station V–1, the $S_1$ lead is connected to input interrupt bus *4a* and input talk bus 5*a* by way of contacts $I_1$–1 and $T_1$–3 of relays $T_1$ and $I_1$, respectively, as well as to frame monitor FM–1; the $P_1$ lead is connected to talk monitor TM–1; and the $R_1$ lead is connected to output interrupt bus *4b* and output talk bus *5b* by way of contacts $T_1$–1 and $T_1$–2 of relay $T_1$.

Prior to the entry of a request to talk from one of the vocoder stations, the conference equipment is in the idle condition and all of the T and I relays are in the released or de-energized condition. In this condition all of the receiving paths, $R_1$ through $R_n$, of the vocoder stations are connected through normally closed contacts $T_1$–2 through $T_n$–2 to the output portion of a first unidirectional path denoted output talk bus *5b*, and normally open contacts $I_1$–1 through $I_n$–1 and $T_1$–3 and $T_n$–3 prevent any of the transmission paths $S_1$ through $S_n$ from being connected to either the input portion of a second unidirectional path denoted input interrupt bus *4a* or the input portion of the first unidirectional path denoted input talk bus *5a*. In addition, normally open contacts $T_1$–1 through $T_n$–1 prevent the receiving leads $R_1$ through $R_n$ from being connected to the output portion of the second unidirectional path denoted output interrupt bus *4b*. It is to be understood at this point that relays T and I are illustrated symbolically only, and that the functions of these relays may be performed by any one of a number of conventional devices.

Assuming that the conference equipment is in the idle condition, when a vocoder station subscriber, for example, a subscriber at station V–1, desires to talk, the subscriber indicates his desire by any one of a number of methods, for example, by actuating a push-to-talk switch or simply by talking. This request is transmitted over lead $P_1$ to the associated talk monitor TM–1, and talk monitor TM–1 after recognizing the request-to-talk signal, conveys this request-to-talk signal over lead $C_1$ to allotter 104. Since it was hypothesized that no other station had been recognized as a talker prior to the request from station V–1, allotter 104 operates or energizes relay $T_1$ in response to the request-to-talk signal from talk monitor TM–1. This closes contact $T_1$–3 thereby connecting transmission lead $S_1$ of station V–1 to input talk bus *5a* which is connected to synchronizer 105–T, and from synchronizer 105–T the talker's bit stream is routed via output talk bus 5*b* to the receiving path of all other stations connected to the conference equipment. However, the energizing of relay $T_1$ also closes contact $T_1$–1 and opens contact $T_1$–2, thereby disconnecting the receiving path $R_1$ of station V–1 from output talk bus 5_b_ and transferring it to output interrupt bus 4_b_. This action not only prevents the talker at station V–1 from hearing his own speech sent back to him at full volume and delayed, but also prepares a path so that this talker is able to hear a subscriber at another station who may wish to interrupt. The allotter 104 referred to above and the talk monitors TM–1 through TM–_n_ may be identical in construction with the allotter and talk monitors shown and described in detail in the copending Miller-Young application previously mentioned.

If during the speech of the subscriber at station V–1, another subscriber wishes to interrupt, for example, the subscriber at station V–_n_, the V–_n_ subscriber signifies his desire to talk by signaling over lead $P_n$ to talk monitor TM–_n_ which passes this request to talk to allotter 104 via lead $C_n$. In response to the request-to-talk signal from talk monitor TM–_n_, allotter 104 causes relay $I_n$ to operate. The operation of relay $I_n$ closes contacts $I_n$–1, thereby connecting the transmission lead $S_n$ of station V–_n_ to the input interrupt bus 4_a_ and completing a path from the transmitter of station V–_n_ to the receiver of station V–1 via input interrupt bus 4_a_, synchronizer 105–I, output interrupter bus 4_b_, and closed contact $T_1$–1. In this manner station V–_n_ is able to communicate directly with station V–1 without interfering with the coded signals from station V–1, and V–1 is able to communicate with V–_n_ together with all of the other stations. This noninterfering two-way communication path between a talking station and an interrupting station permits the talking station to relinquish the talk bus to the interruping station if the talker so desires.

Relinquishment may be accomplished in any one of a number of ways, for example, by releasing a push-to-talk button which is detected by the associated talk TM–1 and conveyed to allotter 104 to release or de-energize relay $T_1$. As explained in detail in the copending Miller-Young application, the release of relay $T_1$ allows the request-to-talk signal from the interrupting station to direct allotter 104 to de-energize relay $I_n$ and to energize relay $T_n$, thereby establishing a signal path between lead $S_n$ and the receiving paths of all the other stations via contact $T_n$–3, input talk bus 5_a_, synchronizer 105–T, and output talk bus 5_b_. Thus, allotter 104 operates on a "first-come first-served" basis so that only one talking station and one interrupting station are recognized and connected concurrently. A station attempting to interrupt after another station has been recognized as an interrupting station is ignored by allotter 104 and is not connected. Similarly, once a station has been connected as a talking station, a subsequent request to talk from another station is recognized only as a request to interrupt in order to prevent interference with the talker's coded signal.

In order to avoid the necessity for having the receiver of each listening station resynchronize each time a new talking station is recognized, and for having the receiver of a talking station resynchronze each time a new interrupting station is recognized, frame reference generator 107 supplies an arbitrary constant frame reference signal to all of the vocoder receivers, which are connected to either output talk bus 5_b_ or output interrupt bus 4_b_, via synchronzers 105–T and 105–I on a continuous basis to maintain a uniform synchronization of all stations at all times. Synchronizers 105–T and 105–I cooperate with frame monitors FM–1 through FM–_n_ to delay each frame of the bit stream from a talking or an interrupting station by a selected amount of time which will cause each frame to be delivered to the appropriate vocoder receiver or receivers in synchrony with the arbitrary frame reference signal. Each frame monitor is associated with one of the vocoder stations and is connected to the S lead of the associated station, and synchronizers 105–T and 105–I are respectively interposed in the talk bus 4 and the interrupt bus 5 to divide the talk bus into input and output portions denoted input talk bus 5_a_ and output talk bus 5_b_, and to provide the interrupt bus into input and output portions denoted input interrupt bus 4_a_ and output interrupt bus 4_b_.

It is assumed that framing or synchronizing information is included in each binary word or frame of the bit stream produced by each station; for example, a selected pattern of one or more bits may be placed in a fixed location within each frame. The bit stream produced by a talking station, for example, vocoder station V–1, is passed directly to frame monitor FM–1 associated with station V–1. Frame monitor FM–1, which is shown in detail in FIG. 2, derives from the framing information in the incoming digital signal an indication of the relative time difference between the arbitrary frame reference signal supplied by frame reference generator 107 and the synchronizing information in the incoming digital signals. Since station V–1 is a talking station, a set of contacts denoted $T_1$–4 of energized relay $T_1$ is closed, and an indication of the relative time difference detected by frame monitor FM–1 is conveyed to synchronizer 105–T over a group of paths denoted 10. Synchronizer 105–T is also supplied with the frame reference signal from generator 107 and, as shown in detail in FIG. 2 and described below, synchronizer 105–T delays the incoming coded signal from station V–1 by an amount of time dictated by the relative time difference indication from frame monitor FM–1 so that the coded signal from vocoder station V–1 is delivered so output talk bus 5_b_ in synchrony with the frame reference signal. Since synchronizer 105–T cooperates with each frame monitor in the same manner as that described for frame monitor FM–1, the framing of the words going from any talking station toward all the vocoder receivers of the receiving stations is always the same with respect to the constant frame reference signal from generator 107, thereby eliminating both the need for resynchronizing for each new talker and the delay which accompanies resynchronization.

Assuming that the subscriber at station V–1 has been recognized as the talker by allotter 104, the coded signal from another station, say station V–_n_, that has been recognized as an interrupting station while the subscriber at station V–1 is talking, is passed to the associated frame monitor FM–_n_ via lead $S_n$. Frame monitor FM–_n_ determines the frame relationship, that is, the relative time difference between the frame reference signal from generator 107 and the synchronizing information in the bit stream from station V–_n_ to regulate within synchronizer 105–I the amount of delay encountered by the bit stream from station V–_n_ in passing from input interrupt bus 4_a_ to output interrupt bus 4_b_ in the same manner that frame monitor FM–1 cooperates with synchronizer 105–T for a talker at station V–1. That is, by continuously maintaining all vocoder stations in synchronization with the frame reference signal supplied by generator 107, variations in framing between different interrupting stations are regulated by delaying a coded signal passing from station V–_n_ to the receiver of station V–1 by an amount of time determined by the difference between the arbitrary frame reference to which all stations are synchronized and the synchronizing information in the particular bit stream from station V–_n_.

Turning now to FIG. 2, this drawing illustrates in detail the structure of frame monitors MF–1 through FM–_n_, synchronizers 105–T and 105–I, and frame reference generator 107. Since frame monitors FM–1 through FM–_n_ are identical in construction, only frame monitor FM–1 is shown in detail. Starting with frame reference generator 107, a conventional clock pulse source 107_a_ generates a sequence of standard pulses at the same rate as the digital data or bit stream from the vocoder stations, it being assumed that the vocoder stations are designed or adjusted to have a uniform bit rate. It is further assumed that uniformity of the clock pulse rate of source 107_a_ and the individual vocoder bit rates is regulated by conventional means (not shown) either at a central office or at the conference equipment. Examples of typical bit rates are given in the Edwards-Clapper article referred to above, but it is to be understood that these are merely illustrative of bit rates that may be employed. The clock pulses from source 107*a* are applied to frequency divider 107*b*, which may be of any well-known construction, and divider 107*b* derives from these clock pulses the previously mentioned frame reference signal which bears a pre-assigned relationship to the clock pulses from source 107*a*. For example, if the bit stream from the vocoder station contains "words" or "frames" 54-bits in length, a frame reference signal is generated by divider 107*b* for each frame of 54 pulses from source 107*a*; if desired, the frame reference signal may comprise a single bit or pulse.

The incoming bit stream from station V–1 is applied via lead $S_1$ to the associated frame monitor FM–1, within which the bit stream is applied to a suitable frame synchronization detector 21–1 together with clock pulses from source 107*a*. Detector 21–1 generates a pulse whenever it detects the framing or synchronizing bit pattern within each frame of the incoming bit stream, and this pulse is passed to flip-flop 22–1 to set flip-flop 22–1 to the ZERO condition. In addition, the frame reference signal from generator 107 is applied to flip-flop 22–1 to set flip-flop 22–1 to the ONE condition. In this manner the length of time that flip-flop 22–1 remains in the ZERO condition is equal to the difference in time of occurrence between a synchronizing bit pattern and the next following frame reference signal; for example, if the talker's bit stream contains words 54 bits in length, flip-flop 22–1 may remain in the ZERO condition for an interval ranging from 0 to 53 clock pulse intervals depending upon the relative time difference between the synchronizing bit pattern and the next following frame reference pulse. The ZERO condition of flip-flop 22–1 is conveyed to a conventional gate 23–1, the other input terminal of gate 23–1 receiving clock pulses from source 107*a* in generator 107. By this arrangement gate 23–1 passes clock pulses to a conventional counter 24–1, for example a binary counter, as long as flip-flop 22–1 is in the ZERO condition; that is, clock pulses are counted by counter 24–1 in the interval between the occurrence of a synchronizing bit pattern in each frame of the bit stream and the next following frame reference signal. Hence the number of clock pulses passed by gate 23–1 to counter 24–1 indicates the number of clock pulse intervals, if any, between the synchronizing bit pattern of each frame in the bit stream and each frame reference signed next following the preceding synchronizing bit. The clock pulses passed by gate 23–1 step counter 24–1 from the ZERO condition to which it has been reset by the preceding synchronizing bit until gate 23–1 is disabled by the occurrence of the next frame reference signal, at which point the count condition of counter 24–1 represents the number of clock pulse intervals between the last synchronizing bit pattern and the next following frame reference signal.

The count condition of courter 24–1 is passed by gate 25–1 to flip-flops 26–1 through 26–*j*, gate 25–1 being enabled by the frame reference signal. The number of flip-flops 26–1 through 26–*j* depends upon the length of the words or number of bits in each frame in the vocoder bit stream. For example, for 54 bit vocoder words or frames, counter 24–1 is provided with six binary stages and correspondingly there will be $j=6$ flip-flops 26–1 through 26–6.

The output terminals of flip-flops 26–1 through 26–*j* are connected via corresponding contacts $T_1$–4(1) through $T_1$–4(*j*) and $I_1$–2(1) through $L_2$–2(*j*) to two sets of buses denoted 10 and 11. Each set of buses is provided with *j* individual buses each corresponding to one of the *j* flip-flops in each frame monitor so that each flip-flop 26–*i*, $i=1, 2, \ldots, j$, is connected to the corresponding buses 10(*i*) and 11(*i*) via contacts $T_1$–4(*i*) and $I_1$–2(*i*). Thus when station V–1 is recognized by allotter 104 as the talking station and contacts $T_1$–4(1) through $T_1$–4(*j*) are closed, the bistable conditions of flip-flops 26–1 through 26–*j* are conveyed to synchronizer 105–T over buses 10(1) through 10(*j*). Correspondingly, if station V–*n* is recognized as an interrupting station by allotter 104, the conditions of the corresponding flip-flops in frame monitor FM–*n* are conveyed to synchronizer 105–I via contacts $I_n$–2(1) through $I_n$–2(*j*) over buses 11(1) through 11(*j*).

Assuming that station V–1 has been recognized as a talking station, buses 10(1) through 10(*j*) convey the bistable conditions of flip-flops 26–1 through 26–*j* to the control terminal of a selector switch 28–T within synchronizer 105–T. Selector switch 28–T may be any one of a number of well-known devices which are capable of transferring an incoming signal to any one of a number of selectable "addresses" in response to a control signal specifying a particular address. Thus the output terminal of switch 28–T is symbolically denoted by a single arrow that may be selectably moved to any one of the (N–1) input points or "addresses" of shift register 27–T, each input point corresponding to a delay interval ranging from one to (N–1) clock pulse intervals, where N is the number of bits in each frame of a coded speech signal. Selector switch 28–T is also provided with an input terminal to which is connected input talk bus 5*a*, and a control terminal to which there is conveyed the count condition of counter 24–1 as represented by flip-flops 26–1 through 26–*j*. In response to the "address" represented by the count condition of counter 24–1, switch 28–T selects the appropriate one of the input points of shift register 27–T having the "address" indicated by the count condition of flip-flops 26(1) through 26(*j*) and it is to this input point that the output terminal of switch 28–T is connected. Hence the incoming bit stream from station V–1 on input talk bus 5*a* is delivered to the input point selected by switch 28–T in response to the "address" dictated by frame monitor FM–1. Register 27–T is also supplied with clock pulses from source 107*a* so that each clock pulse advances the incoming bit stream from stage to stage of register 27–T and eventually to the output terminal of register 27–T. By way of example, if counter 24–1 in frame monitor FM–1 indicates that there are two clock pulse intervals between the synchronizing bit pattern of each frame of the incoming bit stream and the frame reference signal, selector switch 28–T directs the incoming bit stream from station V–1 to be applied to the second stage of register 27–T as indicated by the input point denoted "2." This causes the incoming bit stream to be delayed by two clock pulse intervals before it appears at the output terminal of register 27–T. On the other hand, if the synchronizing bit pattern and the frame reference signal are time coincident, thereby indicating synchronization between the framing of the receivers and the incoming bit stream, delay of the bit stream is unnecessary and accordingly selector switch 28–T directs the incoming bit stream to the input point denoted "0" in order to bypass register 27–T and avoid delay of the talker's bit stream.

The output terminal of register 27–T is connected to one of the two input terminals of a conventional OR gate 29–T, the other input terminal of OR gate 29–T being connected to the output terminal of divider 107*b*, and the output terminal of OR gate 29–T being connected to output talk bus 5*b*. By this arrangement uniform synchronization of all stations connected to output talk bus 5*b* is maintained on a continuous basis, since a synchronizing signal is supplied to all such stations, even during intervals in which no transmitter is connected to input talk bus 5*a*, by either the frame reference signal from divider 107*b* or the synchronizing bit pattern of each frame of the talker's bit stream. Hence not only are all listening stations maintained in uniform synchronization, but also the uniform synchronization is maintained on a continuous basis so that there is never even a temporary loss of synchronization.

It is observed that synchronizer 105–I operates in the same fashion as synchronizer 105–T to maintain uniform, continuous synchronization of any station connected to output interrupt bus 4*b*. Thus a bit stream coming in from an interrupting station over input interrupt bus 4*a* is also delayed by the appropriate number of clock pulses in synchronizer 105–I, is dictated by the associated frame monitor over the set of buses denoted 11, before being delivered to output interrupt bus 4*b*. Once a conference connection is established, the receiver of each station in the conference is always connected to either output talk bus 5*b* or output interrupt bus 4*b*, hence the receiver of each station is always maintained in uniform frame synchrony.

It is further observed that the transmission leads S, as shown in FIG. 1 by leads $S_1$ and $S_n$, are connected permanently to their respective frame monitors FM–1 and FM–*n* so that even during intervals in which allotter 104 has not yet recognized a particular station as either a talker or an interrupter, the count condition of the counter within the corresponding frame monitor represents the most recently obtained relative time difference between the synchronizing bit pattern in each frame of a subscriber's bit stream and the arbitrary frame reference signal developed by generator 107. As a result, flip-flops 26–1 through **26–*j* retain the latest relative frame relationship developed by counter 24–1, even during succeeding silent intervals, so that as soon as a station is recognized by allotter 104 the proper amount of delay to be introduced between the appropriate pair of input and output buses 4 or 5 by the corresponding synchronizer is immediately conveyed over the corresponding set of buses 10 or 11 through the closing of the proper set of contacts $T_I$–4(1**) through $T_I$–4(*j*) or $I_I$–2(1) through $I_I$–2(*j*).

Although this invention has been described in terms of providing conference call service to vocoder stations equipped with pulse coding apparatus, it is to be understood that applications of the principles of this invention are not limited to providing such service but include providing conference service in any situation where it is desired both to prevent interference between coded signals from different stations simultaneously, and to avoid the necessity for resynchronizing the receiver of each conference station every time a different station is recognized as a transmitting station. An example of such a situation is a conference between stations equipped with data transmitting and receiving apparatus. In addition, it is to be understood that the above-described arrangements are merely illustrative of the numerous arrangements that may be devised for the principles of this invention by those skilled in the art without departing from the spirit and scope of the invention.

What is claimed is:

1. A system for providing conference call service to a plurality of stations each equipped with vocoder apparatus, each vocoder apparatus including a transmitter and a receiver for respectively transmitting and receiving pulse coded speech signals, wherein each pulse coded speech signal is characterized by pulse frames each having a predetermined group of frame synchronizing pulses and a group of speech information code pulses, which comprises a first plurality of monitors respectively associated in circuit relation with a corresponding one of said plurality of said stations for detecting request-to-talk and request-to-interrupt signals from said stations, a source of an arbitrary frame reference signal, a second plurality of monitors each of which is supplied with said arbitrary frame reference signal and each of which is associated in circuit relation with the transmitter of a corresponding one of said stations for detecting the relative time difference between said arbitrary frame reference signal and said frame synchronizing pulses in each frame of a coded speech signal from the corresponding station, a first unidirectional path comprising an input portion and an output portion for conveying a coded speech signal from the transmitter of a first selected one of said stations to the receivers of all of the other of said stations, a second unidirectional path comprising an input portion and an output portion for conveying a coded speech signal from the transmitter of a second selected one of said stations to the receiver of said first selected station, first synchronizing means interposed between the input portion and the output portion of said unidirectional path and controlled by that one of said second plurality of monitors associated with said first selected station for delaying the passage from said input portion to said output portion of a coded speech signal from said first selected station by an amount of time equal to the relative time difference detected by said associated one of said second plurality of monitors, second synchronizing means interposed between the input portion and the output portion of said second unidirectional path and controlled by that one of said second plurality of monitors associated with said second selected station for delaying the passage from said input portion to said output portion of a coded speech signal from said second selected one of said stations by an amount of time equal to the relative time difference detected by said associated one of said second plurality of monitors, and an allotter under the control of said first plurality of monitors for connecting said stations to said first and second unidirectional paths in accordance with a predetermined priority.

2. In combination with the apparatus defined in claim 1, a pair of first and second switching devices respectively associated with a corresponding one of each of said first plurality of monitors, said first switching device being energizable by said allotter in response to a request-to-talk signal detected by said associated monitor, and said second switching device being energizable by said allotter in response to a request-to-interrupt signal detected by said associated monitor, wherein said allotter prevents the subsequent energizing of any other first switching device as long as a previously energized first switching device remains energized, and wherein said allotter prevents the subsequent energizing of any other second switching device as long as a previously energized second switching device remains energized, so that said predetermined priority for connecting said stations to said first and second unidirectional paths includes recognizing the first station to enter a request-to-talk signal as the talking station and recognizing first station to enter a request-to-interrupt signal as the interrupting station.

3. Apparatus as defined in claim 2 wherein each of said first and second switching devices comprises an electromechanical switching element provided with a two-terminal energizing winding, one of said winding terminals being connected to a source of potential and the other one of said winding terminals being connected to said allotter, and contact means arranged in combinational contact configuration with selected contact means of said first and second switching devices.

4. Apparatus as defined in claim 3 wherein a first one of said plurality of combinational contact configurations comprises a first group of contact means controlled by said first switching device including first normally open contact means interposed between the transmitter of the station corresponding to that one of said first plurality of monitors with which said pair of switching devices is associated and the input portion of said first unidirectional path for connecting said transmitter to the input portion of said first unidirectional path in response to the energizing of said first switching device, and second normally open contact means and third normally closed contact means respectively interposed between the receiver of said corresponding station and the output portions of said second and first unidirectional paths for respectively connecting the receiver of said corresponding station to the output portion of said second unidirectional path in response to the energizing of said first switching device and to the output portion of said first unidirectional path in response to the de-energizing of said first switching device, and a first normally open contact means controlled by said second switching device and interposed between the transmitter of said corresponding station and the input portion of said second unidirectional path for connecting said transmitter to the input portion of said second unidirectional path in response to the energizing of said second switching device, so that coded speech signals from the vocoder station first recognized as a talking station are conveyed from the transmitter of said talking station over said first unidirectional path to the receivers of all other vocoder stations, and so that coded speech signals from the vocoder station first recognized as an interrupting station are conveyed from the transmitter of said interrupting station over said second unidirectional path to the receiver of said talking station.

5. In combination with the apparatus defined in claim 4, a first signal path comprising a first selected group of subpaths for connecting each of said second plurality of monitors to said first synchronizing means, a second signal path comprising a second selected group of subpaths for connecting each of said second plurality of monitors to said second synchronizing means, and a second one of said combinational contact configurations interposed between a corresponding one of each of said second plurality of each of said second combinational contact configurations including monitors and said first and second signal paths, a plurality of normally open contact means controlled by said first switching device and interposed between said corresponding one of said second plurality of monitors and said first signal path, and a plurality of normally open contact means controlled by said second switching device and interposed between said corresponding one of said second plurality of monitors and said second signal path.

6. A system for providing conference service to a plurality of stations each equipped with a transmitter and a receiver for respectively transmitting and receiving pulse coded speech signals, wherein each pulse coded speech signal is characterized by pulse frames each having a predetermined group of frame synchronizing pulses and a group of information code pulses, which comprises a source of an arbitrary frame reference signal including means for generating clock pulses at a predetermined rate, and dividing means for deriving said frame reference signal from said clock pulses, a plurality of monitors each of which is supplied with said arbitrary frame reference signal and each of which is associated in circuit relation with the transmitter of a corresponding one of said stations for detecting the relative time difference between said arbitrary frame reference signal and said frame synchronizing pulses in each frame of a coded signal from its corresponding station, a first unidirectional path comprising an input portion and an output portion for conveying a coded signal from the transmitter of a first selected one of said stations to the receivers of all of the other of said stations, a second unidirectional path comprising an input portion and an output portion for conveying a coded signal from the transmitter of a second selected one of said stations to the receiver of said first selected station, first synchronizing means interposed between the input portion and the output portion of said first unidirectional path and controlled by that one of said plurality of monitors associated with said first selected station for delaying the passage from said input portion to said output portion of a coded signal from said first selected station by an amount of time equal to the relative time difference detected by said associated one of said plurality of monitors, second synchronizing means interposed between the input portion and the output portion of said second unidirectional path and controlled by that one of said plurality of monitors associated with said second selected station for delaying the passage from said input portion to said output portion of a coded signal from said second selected station by an amount of time equal to the relative time difference detected by said associated one of said plurality of monitors, a pair of switching devices associated with each of said stations, and an allotter under the control of said plurality of monitors for operating said switching devices to connect said stations to said first and second unidirectional paths in accordance with a predetermined priority.

7. Apparatus as defined in claim 6 wherein each of said plurality of monitors comprises counting means provided with a count condition capacity for indicating the relative time difference between said arbitrary frame reference signal and said frame synchronizing pulses in each frame of a coded signal, means supplied with said arbitrary frame reference signal and a coded signal for setting the count condition of said counting means to indicate said relative time difference, means for resetting the count condition of said counting means to zero in response to the frame synchronizing pulses of each frame of a coded signal, and means for transferring said count condition from said counting means to said first connecting means.

8. Apparatus as defined in claim 6 wherein said first synchronizing means comprises a first delaying means provided with a plurality of selectable delay intervals corresponding to each relative time difference detectable by each of said plurality of monitors, first selector means controlled by that one of said plurality of monitors associated with said first selected station and supplied with an incoming coded signal from said first selected station for selectively applying said coded signal to said delaying means so that said coded signal is delayed by the selectable delay interval corresponding to the relative time difference detected by said associated one of said plurality of monitors, and second means supplied with said frame reference signal and said selectably delayed coded signal for conveying said frame reference signal and said selectably delayed coded signal to said output portion of said first unidirectional path.

9. Apparatus as defined in claim 6 wherein said second synchronizing means comprises a second delaying means provided with a plurality of selectable delay intervals corresponding to each relative time difference detectable by each of said plurality of monitors, second selector means controlled by that one of said plurality of monitors associated with said second selected station and supplied with an incoming coded signal from said second selected station for selectively applying said coded signal to said delaying means so that said coded signal is delayed by the selectable delay interval corresponding to the relative time difference detected by said associated one of said plurality of monitors, and second means supplied with said frame reference signal and said selectably delayed coded signal for conveying said frame reference signal and said selectably delayed coded signal to said output portion of said second unidirectional path.

No references cited.

KATHLEEN H. CLAFFY, *Primary Examiner.*

A. H. GESS, *Assistant Eaxminer.*